United States Patent Office 3,365,287
Patented Jan. 23, 1968

3,365,287
USE OF SIDEROCHROMES ON PLANTS
Hans Zaehner, Tubingen, Germany, assignor to Ciba
Limited, Basel, Switzerland, a company of Switzerland
No Drawing. Filed Aug. 12, 1965, Ser. No. 479,302
Claims priority, application Switzerland, Sept. 8, 1964,
11,682/64
2 Claims. (Cl. 71—1)

ABSTRACT OF THE DISCLOSURE

Iron deficiency in plants is combated by treatment with preparations containing as active ingredients a siderochrome, particularly a ferrioxamine, such as ferrioxamine B or a salt thereof. Optionally, additives, such as vehicles, solvents, dispersants, fertilizers, adhesives and pesticides, can be included.

---

The present invention provides preparations for supplying iron to plants, containing as active ingredient a siderochrome and, if desired, one or several additives such as vehicles, solvents, dispersants, adhesives, fertilizers and pesticides. The invention provides above all preparations of the indicated kind that contain as active ingredient a ferrioxamine or a salt thereof, e.g., ferrioxamine B or a salt thereof.

Simons and his co-workers (1962) have tested a number of synthetic iron complex formers and the iron complexes formed by them for their suitability as iron donors for plants. They have shown that iron complexes having a stability constant within the range from $10^{15}$ to $10^{25}$ are very suitable as iron donors, while a complex of $K20 = 10^{23}$ was only restrictedly suitable and the complexes having constants above $10^{28}$ (ferri-cyclohexanediamine tetraacetic acid: $K = 10^{29}$, and ferri-ethylenebishydroxyphenylglycin: $K =$ greater than $10^{30}$) could not be used as iron donors.

It could not have been expected that ferrioxamine-B hydrochloride would prove to be a good iron donor for plants although its complex constant is $10^{30.7}$. The limitation of the action found by Simons and co-workers to complexes having a constant of less than $10^{28}$ thus does not apply to the siderochromes. Siderochromes are ferric complexes of natural trihydroxamic acids. Compounds in this class of natural products are:

Ferrioxamines A, B, C, $D_1$, $D_2$, E, F and G, ferrichrome and ferrichrome A, ferrichrysine, ferricrocin, ferrirubin, ferrirhodin, coprogen and Terregens factor.

The observation that the siderochromes as natural ferric complexes are good iron donors for plants and thus have a beneficial influence on the growth of the plants had another unexpected aspect:

Siderochromes are natural trihydroxamates. The asymmetrin (=hadacidin), that is to say the N-formylhydroxyaminoacetic acid-γ, has been described as a natural substance that inhibits the growth of plants (cf. Zaroogian and Curtis 1961, 1963, 1964). As far as the iron complexes of the natural trihydroxamates are concerned no inhibition of plant growth has so far been observed.

The siderochromes and their manufacture have been described in the following publications:

V. Prelog, "Iron-containing Antibiotics and Microbic Growth Factor," in the book, "Pointers and Pathways in Research," of Birla Matushri Sabhagar, Bombay, 1963 (published by Maeve O'Connor), and in German specifications 1,123,436, 1,163,337; U.S. specification 3,118,823; French specifications 1,344,583, 1,355,923, 1,360,549, 1,360,550, 1,371,446; Belgian specification 645,504.

Ferrioxamine B has, for example, the following constitution:

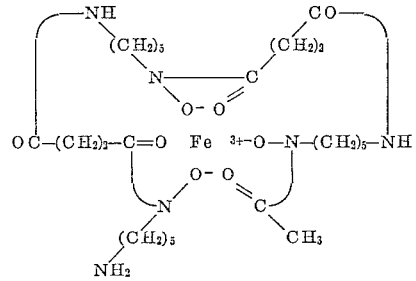

It is an essential advantage of the siderochromes compared with the known iron chelates used in plant protection, especially "Edta," that they can be applied in the form of a mixed preparation in conjunction with other metal-containing sprays, for example agents containing copper, without an exchange of the metal in the siderochrome complex or a decomposition of this complex occurring. This makes it possible to carry out a combined treatment, for example simultaneous spraying with an iron preparation and with a fungicide containing copper, in a single application.

Further advantages of the siderochromes to be used in this invention are the small amount needed thereof and their absolute non-toxicity towards warm-blooded animals.

EXAMPLE 1.—FERRIOXAMINE B HYDROCHLORIDE AS IRON DONOR

*Plants tested.*—Tomatoes, Tuckswood strain. The plants were grown in soil up to a height of about 12 cm., then cut off above the ground and used as seedlings in water cultures.

*Test arrangement.*—Water cultures in Mitscherlich pots with 4 plants per pot. Each pot was covered with an aluminum lid having 4 holes and the plants were secured in the holes by means of small wads of glass wool. At the start the shoots dipped into the solution; after roots had formed the level of the nutrient solution was lowered so that only the roots were immersed in it.

*Nutrient solution.*—Classic Knop's nutrient solution without addition of iron, but 3 g. of lime (calcium carbonate) per litre were added and the whole was thoroughly mixed. The iron donations (for kind and amount see the table) were added to the nutrient solution right at the start of the tests and the nutrient solutions were repeatedly thoroughly stirred.

*Assessment of the test results.*—4 weeks after planting the plants were cut off above the wad of glass wool and each plant was weighed separately. For each procedure 16 plants were used.

*Test results.*—For quantitative evaluation see Tables 1 and 2. Ferrioxamine B is capable of replacing in a water culture the effect of iron(III)-Edta ("Edta"=ethylenediamine tetraacetic). In one test the "ferrioxamine plants" compared with the "Edta plants" revealed a distinct advance in growth which however had almost disappeared towards the end of the test period, whereas in the other test the plants behaved identically, irrespective of whether the plants were given iron as iron(III)Edta or as ferrioxamine. Both the "ferrioxamine plants" and the "Edta plants" displayed a distinct advance in growth, for example in the flower buds, compared with the results of the other procedures (no iron, iron as ferric chloride and the iron complex of acetyhydroxamic acid). The plants to which iron was supplied by way of ferric chloride displayed strong chloroses as well as necroses in the intercostal planes. Both the "Edta plants" and the "ferrioxamine plants" were of a strong dark-green colour and of a healthy appearance.

TABLE 1.—EFFECT OF IRON ADDITION ON THE GROWTH OF TOMATO PLANTS IN WATER CULTURES

| Tests | Addition to Knop nutrient solution without Fe | | | Ferri-oxamine B, mg./litre | Average weight of plant after 4 weeks, grams | Aspect of plant |
|---|---|---|---|---|---|---|
| | Chalk g./litre | FeCl$_3$.6H$_2$O, mg./litre | Edta, mg./litre | | | |
| 1 | | | | | 6.74 | Yellow: necroses. |
| 1 | | 10 | | | 8.16 | Faintly yellowish. |
| 1 | 3 | | | | 6.57 | Deep yellow; necroses. |
| 1 | 3 | 10 | | | 7.1 | Do. |
| 1 | 3 | | | 0.2 | 9.2 | Faintly yellowish; some necroses. |
| 1 | 3 | | | 2.4 | 10.7 | Dark green. |
| 1 | 3 | | | 24 | 10.9 | Do. |
| 1 | 3 | 10 | 2 | | 9.8 | Do. |
| 1 | 3 | 10 | 20 | | 10.9 | Do. |

The tests were conducted in dim light.

TABLE 2.—EFFECT OF IRON ADDITION ON GROWTH OF TOMATO PLANTS IN WATER CULTURES

| Test | Addition to Knop nutrient without Fe | | | Ferrioxamine B, mg./litre | Average weight of plant after 4 weeks, grams |
|---|---|---|---|---|---|
| | Chalk, g./l. | Ferric chloride, mg./l. | Edta, mg./l. | | |
| II | | | | | 5.7 |
| II | | 27 | | | 14.0 |
| II | 3 | | | | 6.6 |
| II | 3 | 27 | | | 11.0 |
| II | 3 | | | 6.5 | 16.3 |
| II | 3 | | | 0.65 | 10.6 |
| II | 3 | | | 0.06 | 6.2 |
| II | 3 | 27 | | 6.5 | 15.2 |
| II | 3 | 27 | | 0.65 | 12.1 |
| II | 3 | 27 | | 0.06 | 11.1 |
| II | 3 | | 2.9 | | 14.8 |
| II | 3 | 27 | 0.3 | | 11.8 |
| II | 3 | 27 | 0.03 | | 11.2 |

The tests were conducted in bright light.

EXAMPLE 2

*Plants.*—6-year-old espalier vines, Magliasina strain (blue hybrides). The vines developed chlorosis of the leaves immediately these appeared. By the beginning of June the chlorosis had developed so extensively that with the oldest leaves the intercostal planes became necrotic.

At the beginning of June the vines were treated with an aqueous solution containing 0.05% of ferrioxamine B, contained in a sprayer carried on the back.

Within 10 days from the treatment the chlorotic leaves had turned green again. In areas where before the treatment necroses had already appeared, the still living leaf portions had likewise become green again.

In the subsequent period the whole plant continued to grow perfectly normal, healthy leaves. The healing effect persists because up to August 9, i.e., about 70 days after the treatment, no new symptoms of chlorosis appeared.

When under the same practical conditions a control test was made with "Edta," the chlorosis of the plants did not disappear, even when an amount of active principal was applied which was at least 3 times as high as that of the ferrioxamine B.

What is claimed is:

1. A method for combating iron deficiency in plants, which comprises treating the plants with a preparation containing as active ingredient a siderochrome.

2. A method according to claim 1, in which the preparation contains as active ingredient a member selected from the group consisting of a ferrioxamine and a salt thereof.

References Cited

UNITED STATES PATENTS 3,118,823   1/1964   Gaeumann et al. _____ 195—80

DONALL H. SYLVESTER, *Primary Examiner.*

R. BAJEFSKY, *Assistant Examiner.*